United States Patent

Miyakawa et al.

[11] Patent Number: 6,091,047
[45] Date of Patent: Jul. 18, 2000

[54] LASER TEXTURE PROCESSING APPARATUS AND METHOD

[75] Inventors: Toshio Miyakawa; Masaru Yonekawa, both of Tokyo, Japan

[73] Assignee: NEC Corporation, Tokyo, Japan

[21] Appl. No.: 09/132,739

[22] Filed: Aug. 12, 1998

[30] Foreign Application Priority Data

Aug. 12, 1997 [JP] Japan ................................. 9-216904

[51] Int. Cl.⁷ .............................. B23K 26/00; G11B 5/84
[52] U.S. Cl. .............................. 219/121.68; 219/121.69; 219/121.75; 219/121.83; 700/166
[58] Field of Search ..................... 219/121.61, 121.68, 219/121.69, 121.83, 121.62, 121.73, 121.75; 427/554, 555, 556; 360/135; 264/400; 700/166

[56] References Cited

U.S. PATENT DOCUMENTS

| 5,768,076 | 6/1998 | Baumgart et al. | 360/135 |
| 5,951,891 | 9/1999 | Barenboim et al. | 219/121.68 |
| 5,952,014 | 9/1999 | Wada et al. | 264/400 |

*Primary Examiner*—Geoffrey S. Evans
*Attorney, Agent, or Firm*—Sughrue, Mion, Zinn, Macpeak & Seas, PLLC

[57] ABSTRACT

A laser texture processing apparatus of the present invention for melting a surface of a hard disc 9 and forming a ring-shaped melted trace, including a laser oscillator 1 that is a beam source, an objective lens 8 for condensing a laser beam on a surface of the hard disc 9, and a depolarizer 7 for artificially depolarizing a laser beam which enters a beam path of the laser beam from the laser oscillator 1 to the objective lens 8.

13 Claims, 4 Drawing Sheets

LASER TEXTURE PROCESSING APPARATUS AND METHOD

BACKGROUND OF THE INVENTION

The present invention relates to laser texture processing apparatus and method, and more particularly to laser texture processing apparatus and method for applying texture processing to a contact start and stop zone of a hard disc using a laser beam.

Such a kind of conventional laser texture processing apparatus or method is used for manufacturing the contact start and stop zone by applying a condensed laser beam to a limited range of a surface of the hard disc to melt the surface in the limited range and forming hundreds of thousands of minute ring-shaped projections (referred to as bumps, hereinafter) having a constant height of 100–300 Å.

FIG. 4 is a schematic view showing an arrangement of a conventional laser texture processing apparatus.

The laser texture processing apparatus has a laser beam source 21, lenses 23 for condensing a laser beam on a surface of a hard disc 22, a beam attenuator 24 for attenuating power of the laser beam applied to the hard disc 22 and controlling the power so as to be predetermined power, a linear stage 25 for carrying the laser beam source, the lenses and the beam attenuator and moving in a direction along a radius of the hard disc 22, and a spindle 26 for rotating the hard disc. Height of the bumps can be changed by varying the power of the laser beam or varying a pulse width of the laser beam by means of the beam attenuator 24.

However, as the diameter of the bump to be formed is smaller, an amount of the change (referred to as processing sensitivity, hereinafter) of height of the bump to an amount of the change of an output value of the laser height, and since the height of the bump is remarkably effected by stability of the laser beam, there is a task that it is much difficult to form the bump having uniform height in the prior art.

SUMMARY OF THE INVENTION

Therefore, the objective of the present invention is to solve the above-mentioned task.

Also, the objective of the present invention is to provide a laser texture processing apparatus or method capable of easily forming a bump having uniform height, also in case of diminishing the diameter of the bump.

The objective of the present invention is achieved by a laser texture processing apparatus of the present invention for melting a surface of a hard disc (denoted by a reference numeral 9 in FIG. 1) and forming a ring-shaped melted trace. The laser texture processing apparatus includes a laser oscillator (denoted by a reference numeral 1 in FIG. 1) that is a beam source, an objective lens (denoted by a reference numeral 8 in FIG. 1) for condensing a laser beam on a surface of the hard disc (denoted by a reference numeral 9 in FIG. 1), a depolarizer (denoted by a reference numeral 7 in FIG. 1) for artificially depolarizing a laser beam which enters a beam path of the laser beam from the laser oscillator (denoted by a reference numeral 1 in FIG. 1) to the objective lens (denoted by a reference numeral 8 in FIG. 1).

The objective of the present invention is also achieved by a laser texture processing method of melting a surface of a hard disc and forming a ring-shaped melted trace. The method includes steps of (a) emitting a laser beam from a laser oscillator, (b) condensing the emitted laser beam on a surface of the hard disc, and (c) artificially depolarizing a laser beam which enters a beam path of a laser beam from the laser oscillator to a point where the emitted laser beam is condensed.

In accordance with the present invention, in case of making the laser beam condensed by the objective lens to be in a depolarized state, condensing a laser beam with linear polarization, and forming a melted trace on a surface of the hard disc, even though the laser beam is condensed to a small spot, it is possible to prevent processing sensitivity from being large.

The laser texture processing apparatus of the present invention further includes a beam attenuator (denoted by a reference numeral 2 in FIG. 1) for attenuating and adjusting power of the laser beam which enters the depolarizer (denoted by a reference numeral 7 in FIG. 1).

The laser texture processing method of the present invention further includes a step of, before the step (c), attenuating and adjusting power of the condensed laser beam.

In accordance with the present invention, it is possible to attenuate the power of the laser beam which is applied to the hard disc to proper power for the processing, and also, in case that an effect of reducing the processing sensitivity is varied by the power of the laser beam which enters the depolarizer, it is possible to maintain a predetermined effect.

The laser texture processing apparatus of the present invention further includes an expander (denoted by a reference numeral 6 in FIG. 1) for magnifying and adjusting beam diameter of the laser beam which enters the depolarizer (denoted by a reference numeral 7 in FIG. 1).

The laser texture processing method of the present invention further includes a step of, before the step (c), magnifying and adjusting beam diameter of the condensed laser beam.

In accordance with the present invention, it is possible to make a spot to which the laser beam is condensed by the objective lens to be small, and also, in case that the processing sensitivity is varied by power density of the laser beam which enters the depolarizer, it is possible to make the power density proper.

In order to achieve the objective of the present invention, the laser texture processing apparatus of the present invention further includes a control section for generating a control signal for controlling proper power and burning of a laser beam at a pulse burning interval based on a predetermined processing condition, and outputting the control signal to the laser oscillator.

Also, the laser texture processing method of the present invention further includes a step of generating a control signal for controlling proper power and burning of a laser beam at a pulse burning interval based on a predetermined processing condition, and outputting the control signal to the laser oscillator.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
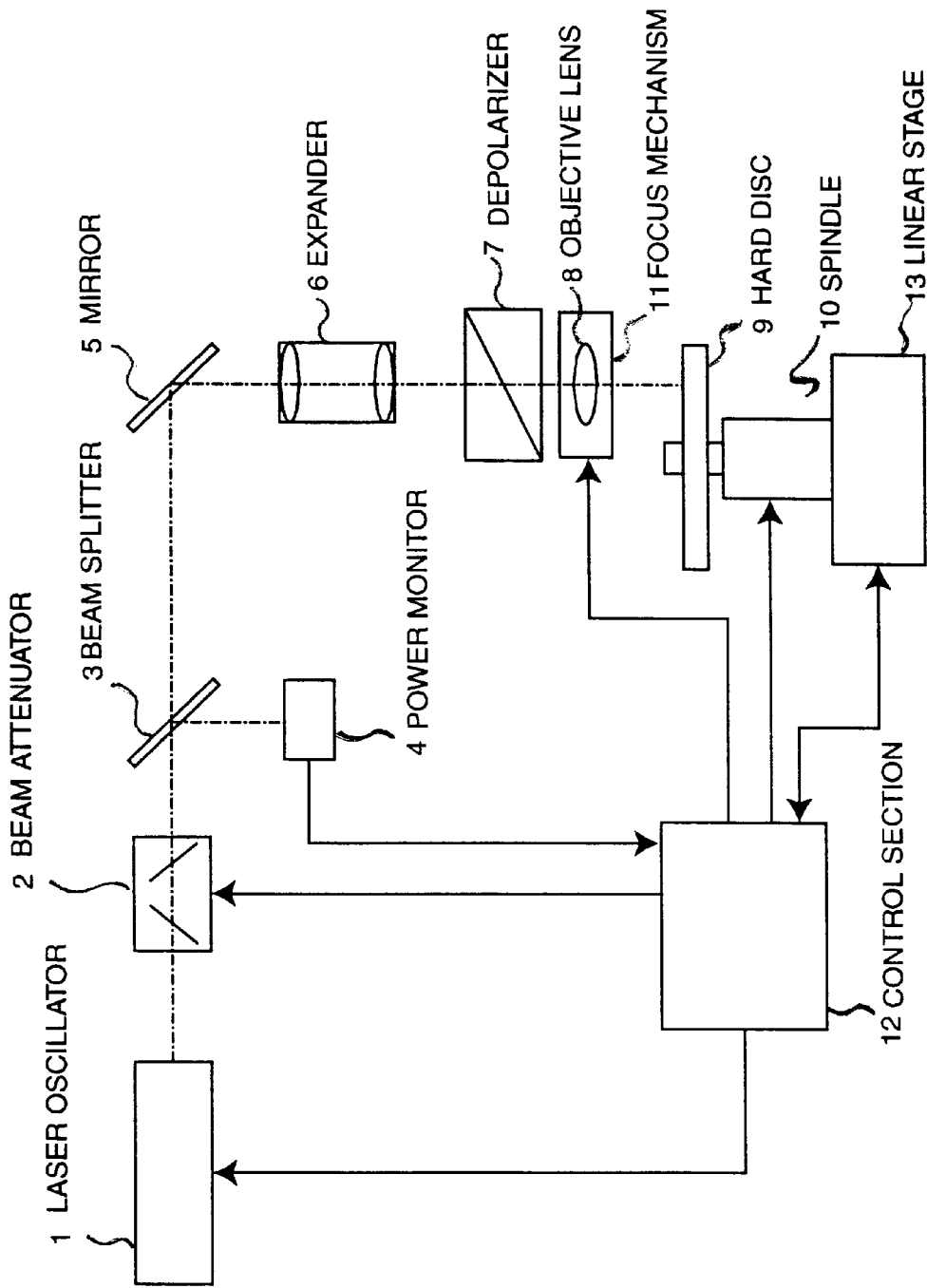
FIG. 1 is a schematic view showing an arrangement of a laser texture processing apparatus of the present invention.

Next, embodiments of the present invention will be explained in detail by referring to the drawings.

FIG. 1 is a schematic view showing an arrangement of a laser texture processing apparatus of the present invention.

A laser oscillator 1 is a beam source for conducting texture processing. For example, a Q-switch pulse laser oscillator is used for the laser oscillator. A beam attenuator 2 attenuates a laser output that is output from the laser oscillator 1, and adjusts power of a laser beam for conducting the texture processing to predetermined power. In addition, a beam splitter 3 which is set up on an output side of the beam attenuator 2 introduces the laser beam into a power monitor 4, and the power monitor detects power of the laser beam, and a control section 12 mentioned below controls the beam attenuator 2 by referring to the detected power and conducts power control.

The laser beam which passes through the beam splitter 3 is reflected by a mirror 5, and beam diameter of the laser beam is magnified and adjusted by the expander 6, and the laser beam passes through the depolarizer 7 and a polarized state of the laser beam is artificially made to be a depolarized state.

The laser beam which passes through the depolarizer 7 is condensed by the objective lens 8 on a surface of a hard disc 9 which is rotated by a spindle 10. Also, in order to follow up the movement of the surface of the hard disc by means of the spindle 10, the objective lens 8 is moved by a focus mechanism 11 which moves in an optical axis. Furthermore, the control section 12 conducts rotational control of these beam attenuator 2 and hard disc 9, focus control of the focus mechanism 11 and movement control of a linear stage 13 at predetermined timing. Also, the control section 12 generates a control signal for controlling predetermined proper power and burning of the laser beam at a pulse burning interval, based on a processing condition, such as quality of the material and thickness of the hard disc 9, and an environmental condition under which the processing of the hard disc 9 is conducted, and outputs the control signal to the laser oscillator 1. A relation of the correspondence between these conditions and the control signal is stored in a memory in the control section 12 as a laser oscillator controlling condition table, and by referring to the laser oscillator controlling condition table, the control section 12 generates a control signal to be output to the laser oscillator 1.

Next, texture processing operation of the laser texture processing apparatus of the present invention will be explained.

Figure 2:
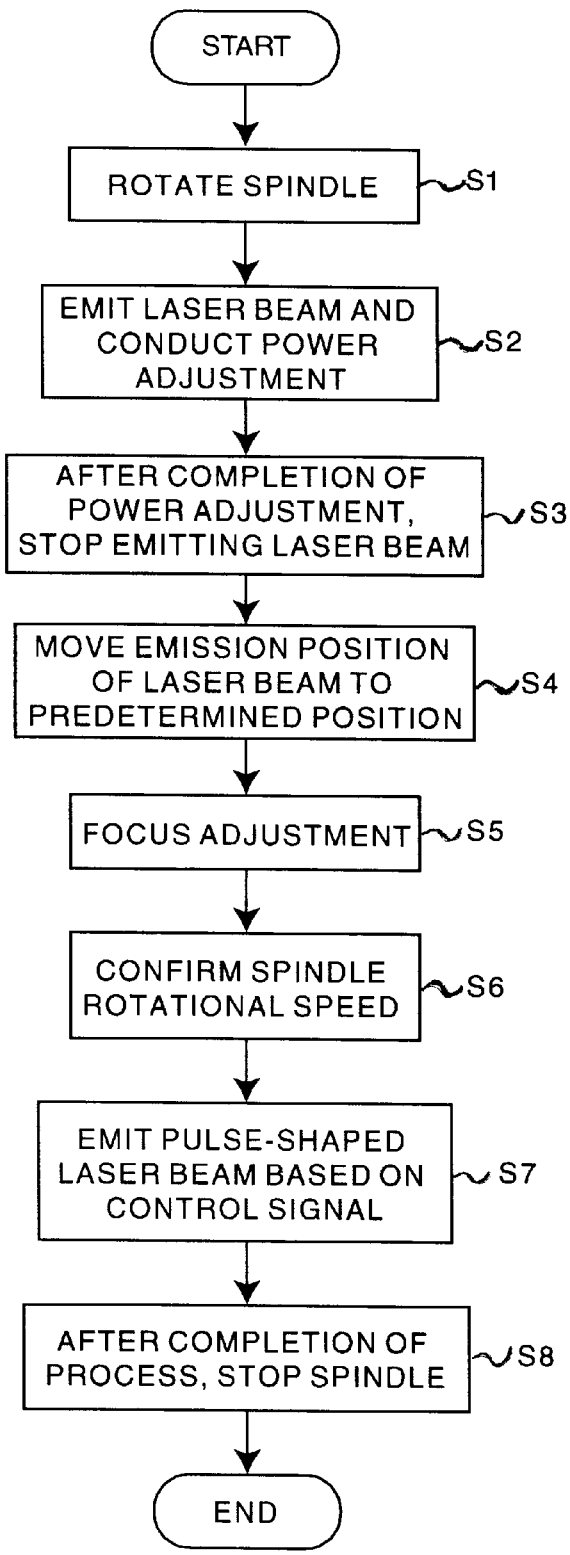
FIG. 2 is a flowchart showing control operation of the laser texture processing apparatus in FIG. 1.

FIG. 2 is a flowchart showing the texture processing operation of the laser texture processing apparatus in FIG. 1.

When the hard disc 9 is set up on the spindle 10, the spindle is rotated at a predetermined rotational speed (STEP 1). Next, by controlling the linear stage 13, the laser beam from the laser oscillator 1 set up an emission position at a position where the laser beam is not applied to the hard disc 9, and the laser oscillator 1 emits the laser beam and the power monitor 4 detects the power of the laser beam, and the beam attenuator 2 conducts power adjustment (STEP 2). After the power adjustment is completed and the power becomes to be predetermined power, the laser oscillator 1 stops emitting the laser beam (STEP 3), and by controlling the linear stage 13, the emission position of the laser beam is moved to a predetermined processing position (STEP 4). And then, at the predetermined position, a laser beam is applied at power, in which the hard disc 9 is not processed, and a focus adjustment is conducted by the focus mechanism 11 (STEP 5). After the focus adjustment is completed, it is confirmed that the spindle 10 is constantly rotating at a predetermined speed (STEP 6), and the control section 12 generates a control signal for controlling predetermined proper power and burning of the laser beam at a pulse burning interval, from a processing condition based on quality of the material and thickness of the hard disc 9, and an environmental condition and so forth under which the processing of the hard disc 9 is conducted, and based on the position on the hard disc 9, and the laser oscillator 1 emits a pulse-shaped laser beam based on the control signal and conducts the texture processing (STEP 7). After the processing is completed, the spindle 10 stops rotating (STEP 8).

In the above-mentioned operation, a bump may be formed at a constant interval by rotating the hard disc 9 at a constant speed, and changing a pulse interval of the laser beam by beans of a position signal from the linear stage 13, which indicates a position in a radial direction on the hard disc 9 on which the bump will be formed.

On the contrary, a pulse interval of the laser beam may be made to be constant by setting a speed of the hard disc 9 to a speed based on a position signal from the linear stage 13.

A concrete embodiment of the above embodiment will be explained.

Figure 3:
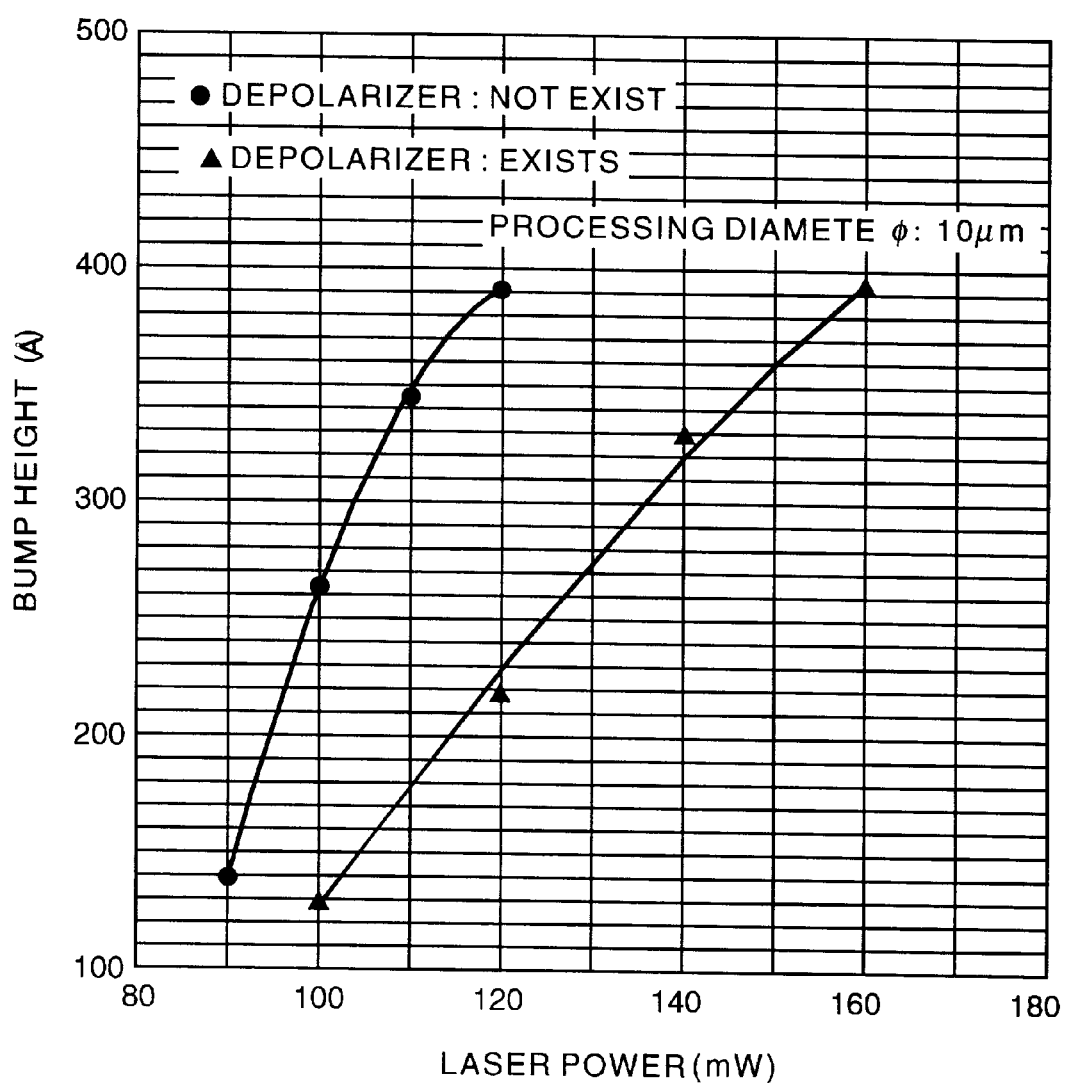
FIG. 3 shows variation characteristic of bump height to a laser output variation in one embodiment of the laser texture processing apparatus of the present invention.
Figure 4:
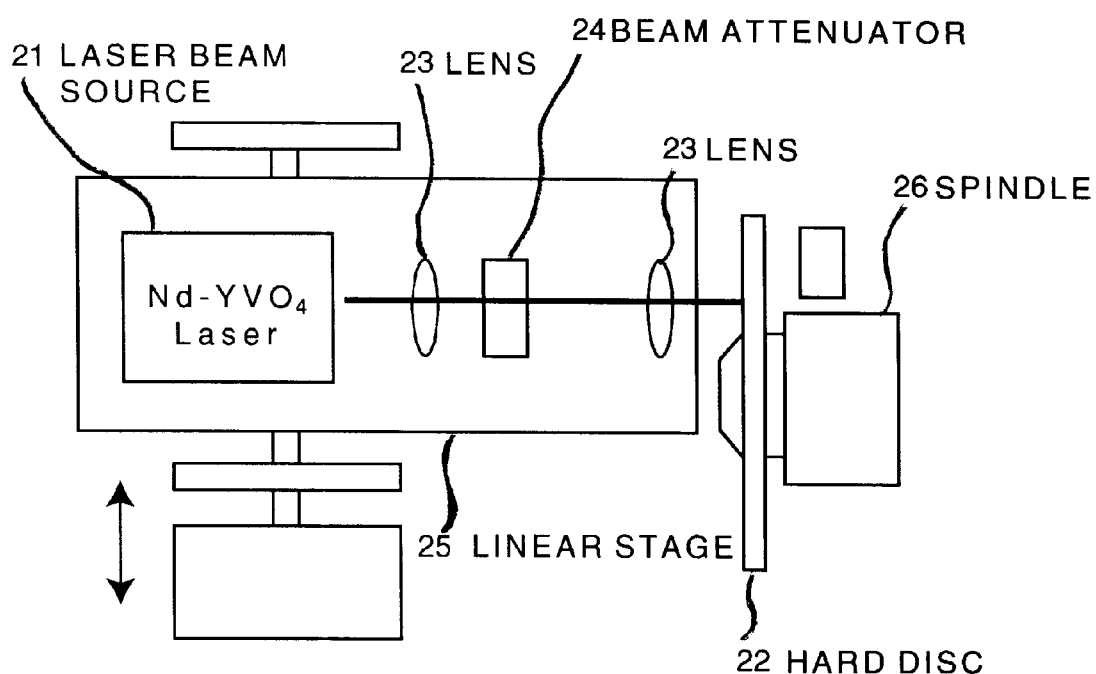
FIG. 4 is a view showing an arrangement of a conventional laser texture processing apparatus.

FIG. 3 shows processing characteristic when processing diameter $\phi$ is 10 $\mu$m, and shows the characteristic of bump height to a laser power by means of black circles in case that the depolarizer 7 is not on a beam path and by beans of black triangles in case that the depolarizer 7 is on a beam path.

As seen from FIG. 3, processing sensitivity around 200 Å of the bump height is 12.4 Å/mW when the depolarizer 7 does not exist and is 4.5 Å/mW when the depolarizer 7 exists, and it is found that the processing sensitivity is lowered to 1/2.76 by inserting the depolarizer 7.

In addition, although, in the above embodiment, the laser beam to be irradiated to the hard disc 9 is constructed to be one spot, an arrangement can be adopted in which the laser beam is separated and the separated beams are applied to a plurality of spots. In this case, high-speed processing can be conducted.

Also, although the depolarizer 7 is set up on the position between the expander 6 and the objective lens 8, the depolarizer 7 can be set up on positions other than the above-mentioned position if an effect of reducing the processing sensitivity in the case in which the depolarizer does not exist can be maintained.

Moreover, a mask for adjusting diameter of the beam which enters the objective lens 8 may be further provided.

Furthermore, a filter for further attenuating the power of the laser beam output from the depolarizer 7 may be provided.

By means of these, in case that an effect of reducing the processing sensitivity is varied by the power and the power density of the laser beam which passes through the depolarizer 7, it is also possible to independently set the set values of the spot diameter and the power of the laser beam which is applied to the hard disc, and the set values of the power and the power density of the laser beam which passes through the depolarizer, respectively.

Also, a position on the hard disc 9 to which the laser beam is applied can be moved by fixing the spindle 10 and moving other components.

As explained above, in the laser texture processing apparatus of the present invention, it is possible to reduce the processing sensitivity by making the laser beam applied to the hard disc to be depolarization by means of inserting the depolarizer into the beam path, and even though an output variation of the laser beam happens, it is possible to reduce influence on bump height and to improve stability of the bump height to be formed.

The entire disclosure of Japanese Patent Application No. 9-216904 filed on Aug. 12, 1997 including specification, claims, drawing and summary are incorporated herein by reference in its entirety.

What is claimed is:

1. A laser texture processing apparatus for melting a surface of an object to be processed and forming a ring-shaped melted trace, said apparatus comprising:

a laser oscillator that is a beam source;

an objective lens for condensing a laser beam emitted from said laser oscillator on a surface of said object to be processed; and a depolarizer for artificially depolarizing a laser beam which enters a beam path of a laser beam from said laser oscillator to said objective lens.

2. A laser texture processing apparatus according to claim 1, further including a beam attenuator for attenuating and adjusting power of a laser beam which enters said depolarizer.

3. A laser texture processing apparatus according to claim 1, further including an expander for magnifying and adjusting beam diameter of a laser beam which enters said depolarizer.

4. A laser texture processing apparatus according to claim 1, further including a control section for generating a control signal for controlling proper power and burning of a laser beam at a pulse burning interval based on a predetermined processing condition, and outputting said control signal to said laser oscillator.

5. A laser texture processing apparatus according to claim 4, wherein a relation of correspondence between said predetermined processing condition and said control signal is stored in a memory provided in said control section, and said control section generates said control signal by referring to said relation stored in said memory.

6. A laser texture processing apparatus according to claim 1, further including a mask for adjusting diameter of a beam which enters said objective lens.

7. A laser texture processing apparatus according to claim 1, further including a filter for further attenuating power of a laser beam output from said depolarizer.

8. A laser texture processing method of melting a surface of an object to be processed and forming a ring-shaped melted trace, said method comprising steps of:

(a) emitting a laser beam from a laser oscillator;

(b) condensing said emitted laser beam on a surface of said object to be processed; and (c) artificially depolarizing a laser beam which enters a beam path of a laser beam from said laser oscillator to a point where said emitted laser beam is condensed.

9. A laser texture processing method according to claim 8, further including a step of, before said step (c), attenuating and adjusting power of said condensed laser beam.

10. A laser texture processing method according to claim 8, further including a step of, before said step (c), magnifying and adjusting beam diameter of said condensed laser beam.

11. A laser texture processing method according to claim 8, further including a step of generating a control signal for controlling proper power and burning of a laser beam at a pulse burning interval based on a predetermined processing condition, and outputting said control signal to said laser oscillator.

12. A laser texture processing method according to claim 11, wherein a relation of correspondence between said predetermined processing condition and said control signal is stored in a memory, and said control signal is generated by referring to said stored relation.

13. A laser texture processing method of melting a surface of an object to be processed and forming a ring-shaped melted trace, said method comprising steps of:

rotating a spindle at a predetermined rotational speed, capable of rotating said object to be processed;

emitting a laser beam and monitoring power of said laser beam, and detecting power of said laser beam and conducting a power adjustment;

moving an emission position of said laser beam to a predetermined processing position after said power adjustment;

emitting a laser beam and conducting a focus adjustment;

confirming that said spindle is constantly rotating at a predetermined speed, after said focus mechanism;

generating a control signal for controlling proper power and burning of said laser beam at a pulse burning interval based on a predetermined processing condition; and emitting a pulse-shaped laser beam based on said control signal and conducting a texture processing.

* * * * *